United States Patent [19]

Douma et al.

[11] Patent Number: 5,990,884
[45] Date of Patent: Nov. 23, 1999

[54] CONTROL OF MULTIMEDIA INFORMATION WITH INTERFACE SPECIFICATION STORED ON MULTIMEDIA COMPONENT

[75] Inventors: Peter Douma, Wyckoff; Frank DeMartin, Bogota, both of N.J.; Denise Miccoli, Yonkers, N.Y.

[73] Assignees: Sony Corporation, Tokyo, Japan; Sony Electronics, Inc., Park Ridge, N.J.

[21] Appl. No.: 08/850,507

[22] Filed: May 2, 1997

[51] Int. Cl.⁶ ........................................................ G06F 3/00
[52] U.S. Cl. .......................... 345/327; 345/329; 345/333; 345/349; 345/970; 345/978; 364/188
[58] Field of Search .................................... 345/326–358, 345/970, 978; 364/188

[56] References Cited

U.S. PATENT DOCUMENTS

| | | | |
|---|---|---|---|
| 5,392,400 | 2/1995 | Berkowitz et al. | 345/331 |
| 5,428,730 | 6/1995 | Baker et al. | 345/349 X |
| 5,657,221 | 8/1997 | Warman et al. | 364/188 |
| 5,727,174 | 3/1998 | Aparicio, IV et al. | 345/348 |
| 5,790,117 | 8/1998 | Halviatti et al. | 345/333 |
| 5,793,366 | 8/1996 | Mano et al. | 345/329 |
| 5,808,612 | 9/1998 | Merrick et al. | 345/970 X |
| 5,839,095 | 11/1998 | Liu | 345/349 X |

OTHER PUBLICATIONS

Petzold, "Programming Windows", Microsoft Press, pp. 12–23, 1988.

*Primary Examiner*—John E. Breene
*Attorney, Agent, or Firm*—Frommer Lawrence & Haug, LLP.; William S. Frommer

[57] ABSTRACT

Multimedia components for reproducing/recording information in a data storage medium are controlled via a personal computer. By selecting graphical representations of the multimedia components and of their control switches, the user enters instructions on the personal computer to perform various operations by the components. The representative operations include turning the component on/off, setting its volume, adjusting its bass/treble, etc. Another operation may include finding a particular track/scene in the user library displayed on the screen and reproducing the track/scene on the corresponding multimedia component by selecting on the screen the graphical representation corresponding to the reproducing operation. An interface specification is transferred from the multimedia component (e.g. VTR, DAT player, CD player) to an intelligent A/V receiver.

19 Claims, 8 Drawing Sheets

CONTROL OF MULTIMEDIA INFORMATION WITH INTERFACE SPECIFICATION STORED ON MULTIMEDIA COMPONENT

BACKGROUND OF THE INVENTION

The present invention is related to network communications and, in particular, to a system and method for controlling multimedia information in audio/video/data system using, for example, a personal computer having Graphical User Interface for user control of multimedia components.

Control of multimedia information in audio/video/data systems may be one of the greatest challenges in today's highly integrated systems comprising many multimedia components. The existence of 200 Compact Disk (CD) changer, for example, creates difficulties in determining how to access the required information on the disk in a simple and user-friendly manner. Hence, users must have means for accessing the multimedia components and information on the recording medium with minimum of effort on their part.

Further, when multimedia components, such as the CD changer, the Video Tape Recorder (VTR), etc. are connected into a single integrated system, interface specifications for each component are typically kept at some central controlling device. If a new component is added to the system, the controlling device must be updated with the interface specification for this new component. This inconvenient procedure is also prone to errors resulting in the inoperative component due to the high likelihood of entering incorrect information in the controlling device. This will prevent the newly added multimedia component from functioning in the system.

In addition, due to the numerous configurations of rooms, concert halls, auditoriums, etc. and many possible sound fields, it is nearly impossible for an audio/video receiver in the integrated system to store all of the sound fields, corresponding to the physical configuration of each enclosed space, in memory. Currently, audio/video receivers have only a small selection of sound fields, because of limited storage capacity and processing power in the audio/video receivers.

A need therefore exists for a system and method for overcoming the above disadvantages.

OBJECTS OF THE INVENTION

It is an object of the present invention to provide a system for controlling multimedia information.

It is another object of the present invention to provide an interface between user-controlled programmable controller and audio/video/data system.

It is a further object of the present invention to provide an interface specification, pertaining to a multimedia component, that is transferrable to a programmable controller.

It is still another object of the present invention to provide a plurality of sound fields according to the music type.

SUMMARY OF THE INVENTION

These and other objects, features and advantages are accomplished by a method and system for controlling multimedia components for manipulating multimedia information in a data storage medium, where each multimedia component has a plurality of control switches. In accordance with the present invention, instructions representing control operations to be carried out on a multimedia component are entered. The instructions are then converted to at least one command for controlling the multimedia component. The multimedia information is manipulated in the data storage medium based on the command corresponding to the control operations carried out on the multimedia component.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

As a general overview, the present invention allows the user to control multimedia equipment via a cable, a network or a group of networks such as the Internet, for example. From a remote location using a personal computer having a modem and Graphical User Interface (GUI), the user may, for example, turn on a Digital Audio Tape (DAT) player to record a particularly interesting radio broadcast or select a particular album/track on a CD for reproduction on the CD player. Such control of audio/video/data equipment is accomplished in a user-friendly environment with minimum of user effort involved in accordance with the present invention, which will now be described in detail with reference to the accompanying drawings.

Figure 1:
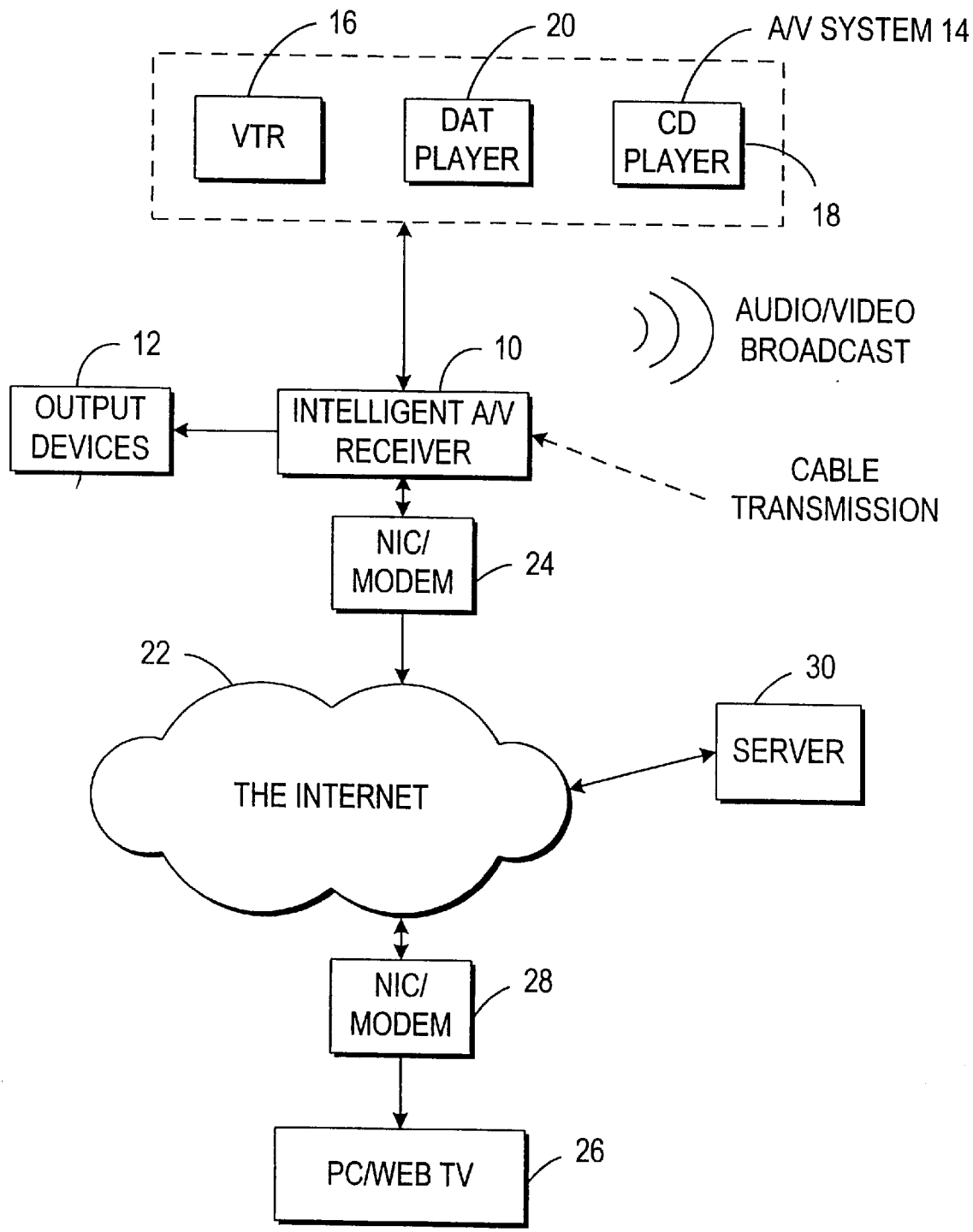
FIG. 1 is a high-level block diagram of the system for remotely controlling audio/video/data equipment in accordance with the present invention.

FIG. 1 is a high-level block diagram of the system for remotely controlling audio/video/data equipment. Intelligent Audio/Video (A/V) receiver 10 receives information signals via a cable or a wireless medium and reproduces information, represented by those information signals, via output devices 12. For example, a radio broadcast program may be received by Intelligent A/V receiver 10 and reproduced via a pair of speakers.

Intelligent A/V receiver 10 also operates as a controller of the integrated Audio/Video (A/V) system 14. That is, Intelligent A/V receiver 10 has a programmable controller for controlling the operations of multimedia components in the system. This can be achieved via such protocol as S-Link™. This protocol fully integrates multimedia components into a single coherent system: the components in this system are automatically configured (e.g., switched to a proper mode of operation) in accordance with the user action. For example, when the user inserts a tape into a VTR, Intelligent A/V receiver 10 changes to the VTR playback mode without any additional user involvement.

In addition, the programmable controller in Intelligent A/V receiver 10 executes instructions of an interface program, such as a "Web" server program, which is located in a data storage of Intelligent A/V receiver 10. This and other features of the present invention will be described in detail hereinbelow.

As previously mentioned, FIG. 1 shows A/V system 14 comprising a plurality of multimedia components such as VTR 16 for recording/reproducing a full motion video or still images on tape, as known in the art; CD player 18 for reproducing music or the like from CDs; and Digital Audio Tape (DAT) player 20 for recording/reproducing digital data on tape. The A/V system may comprise additional multimedia components, such as a DVD player, an analog tape player, mini-disk player, etc. As stated above, VTR 16, CD player 18, and DAT player 20 (i.e., individual multimedia components) form the integrated system that is controlled by Intelligent A/V receiver 10, as explained hereinbelow.

In FIG. 1, Intelligent A/V receiver 10 is connected to the Internet 22 via Network Interface Card (NIC)/modem 24. That is, Intelligent A/V receiver 10 establishes a node—via NIC/modem 24—on a particular network, which is a part of the Internet 22. The NIC serves as an interface for Intelligent A/V receiver 10 by setting up a communications path with users of various networks (forming a part of the Internet) in conformance with the Internet protocol. Alternatively, the dial-up modem may be used for logging on to the network by following the proper communications protocol, as well known in the art.

One of such representative users being on the Internet is shown in FIG. 1. The user has PC/Web TV 26 for controlling A/V system 14 via NIC/modem 28 and the Internet 22. It will be appreciated by skillful artisans that any general purpose computer may be used to control A/V system 14 according to the present invention. Alternatively, a dedicated processor with a conventional input device, such as a keyboard, mouse, etc. for use with the Graphical User Interface program displayed on the monitor, may replace the general purpose computer without any loss in the system functionality. That is, such apparatus as Web TV (an application-specific controller displaying images on the conventional TV) may allow the user the complete control over the multimedia components, such as VTR 16, DAT player 20, CD player 18, etc.

Continuing with the description of FIG. 1, also shown is server 30 connected to the Internet 22. As known in the art, the server is typically a fast-processing computer (a mid-range, a mainframe, multiprocessors, etc.) having a fast access to a local or remote database. According to one aspect of the present invention, server 30 analyzes a reflected test signal to generate sound fields. The sound fields represent acoustical properties of the enclosed space (e.g., a room) to achieve the best listening effects according to the type of music that is currently reproduced on CD player 18, for example. This feature will also be described hereinbelow.

The operation of the inventive system in accordance with one aspect of the present invention will now be described in detail with reference to FIG. 2. Let it be assumed that the user desires to listen to a particular album in his/her personal multimedia library consisting of CDs, tapes, etc. In step 200, the user searches the personal multimedia library on the PC. The library contents (by album title, track name, data storage medium, etc.) are stored in a data storage, such as PC memory, hard disk, floppy disk, etc. Using the Graphical User Interface program in conjunction with any conventional input device such as a mouse, keyboard, etc., the user selects, in step 202, a graphical representation of the recording (storage) medium displayed on a display screen of the PC. This operation may be performed, for example, by placing a cursor on the graphical symbol representing the CD and "clicking" the mouse to select that particular CD.

In step 204, the PC retrieves the recording medium attributes from a database and displayed for user control. The attributes of a CD, for example, may be as follows:

Album title

Track names

Performing artists

Volume level

Sound field type

Balance

Bass/Treble

Noise reduction

Favorite track

These representative attributes are retrieved from the database (data storage associated with the PC) and displayed on the display screen for user manipulation. In addition, the recording medium identification (media I.D.) is obtained from the data storage for the system operation. The media I.D. may include Table of Contents (TOC) of each disk or tape.

As known in the art, the TOC on each disk/tape is a special recording area allocated for various "house-keeping" non-informational data about the recording medium, including, among other things, the number of tracks and the length of each track. As also known in the art, information on the disk/tape may be identified by the TOC data. That is, the number of tracks and the length of each track recorded in the TOC area uniquely identify the title of the disk/tape and the name of each track thereon.

In step 206, once the CD attributes are displayed on the screen, the user enters various playback control commands using the GUI program and input device. That is, the user may set volume level, bass/treble, balance, sound field type according to the music, and other attributes as listed above.

In step 208, the user commands are sent to Intelligent A/V receiver 10 where they are converted to a command script file that also contains the media I.D. Namely, Intelligent A/V receiver 10 uses the Common Gateway Interface (CGI) program or other server program to generate the command script file based on the user instructions entered via GUI. The command script file includes a series of commands for controlling A/V system 14 in accordance with a smart control protocol used in multimedia components. For example, the Assignee of the present invention has such a protocol referred to as S-Link™, as mentioned above, for obtaining the fully integrated system.

In step 210, Intelligent A/V receiver 10 identifies, based on the media I.D, the multimedia component for replaying the user-selected recording medium. A look-up table, for example, may be used for such a purpose: a table stored in RAM, for example, containing media I.D. corresponding to the multimedia component (VTR 16, CD player 18, DAT player 20) in A/V system 14.

Intelligent A/V receiver 10 then sends the user playback control commands, as converted by the CGI program for example, to the appropriate multimedia component in step 212. The volume, balance, bass/treble, etc. of CD player 18, for example, are controlled, in step 214, in accordance with the user instructions.

In addition to the above exemplary user selection of the recording medium, in another aspect of the present invention, the user may select a track album or a particular track/scene in the library, without indicating the type of the recording medium. In other words, although the user remembers having a particular song in the personal multimedia library, the user does not know whether the song is recorded on DAT, CD, etc. By retrieving the listing of all of the songs in the library and by selecting the song via the GUI program, the recording medium corresponding to the user selection is identified. This operation may be easily implemented using a look-up table (each song I.D. paired with the corresponding multimedia component), similar to the above-described look-up table for the multimedia components. Once the recording medium corresponding to the user-selected song/scene is identified, the system operation continues with step 202 of FIG. 2, as described above.

Figure 3:
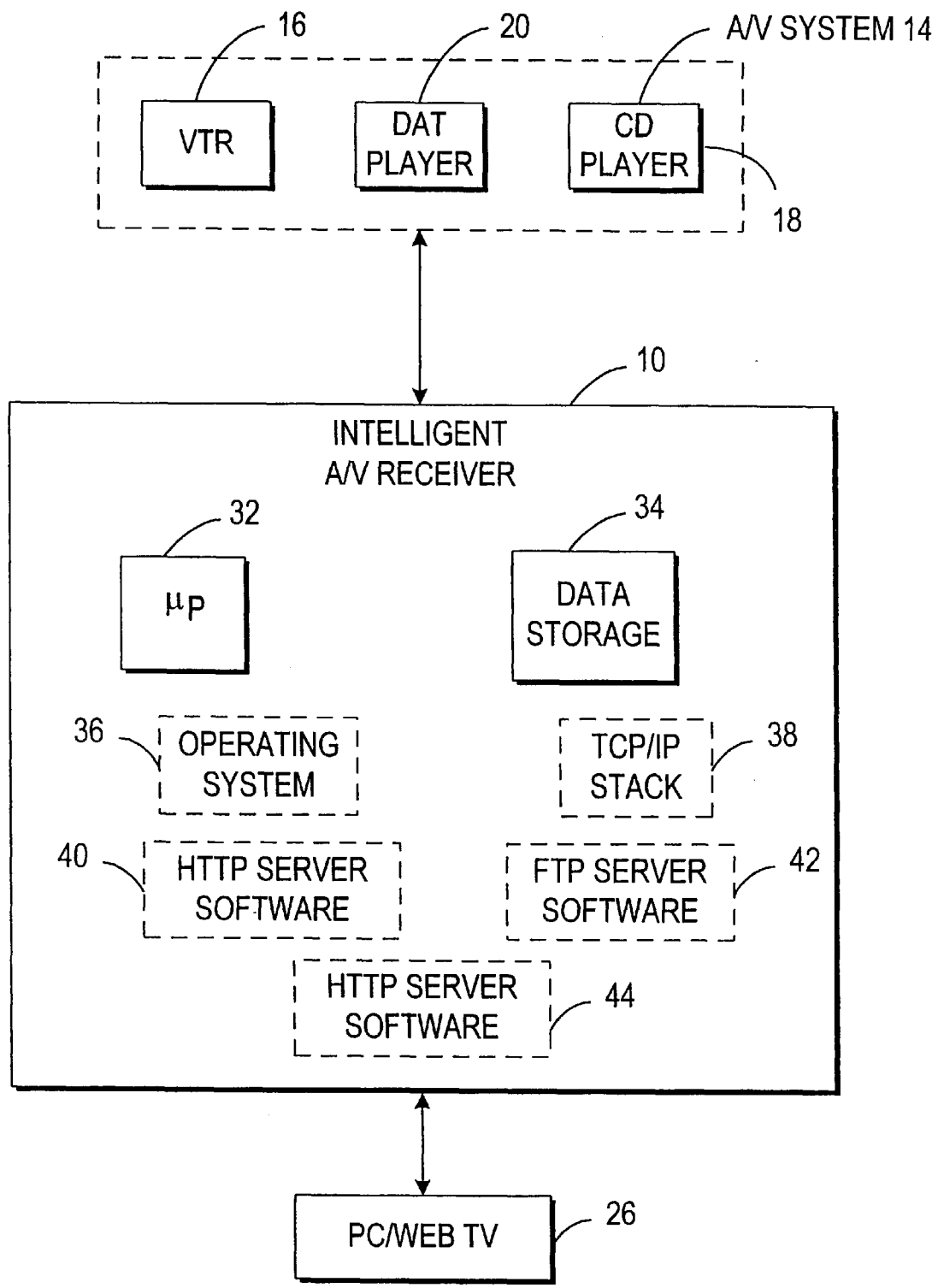
FIG. 3 is a detailed block diagram of the interface between Intelligent A/V receiver 10 and PC/Web TV 26.

Although FIG. 1 shows PC/Web TV 26 connected to Intelligent A/V receiver 10 via the Internet 22, it will be appreciated that this connection does not have to be via the Internet 10 (or any other network for that matter). As shown in FIG. 3, for example, a direct cable between the two components (PC/Web TV 26 and Intelligent A/V receiver 10) may enable the user to control A/V system 14 as described above. Namely, PC/Web TV 26 may communicate with Intelligent A/V receiver 10 via a cable in conformance with the RS232 Serial Bus standard using, for example, Universal Asynchronous Receiver Transmitter (UART). It will be appreciated by those skilled in the art that any other bus, such as the IEEE 1394 Serial Bus standard, may be used for establishing communication between PC/Web TV 26 and Intelligent A/V receiver 10.

As known in the art, the "Web" server program may include Hypertext Transfer Protocol (HTTP) and File Transfer Protocol (FTP) programs for downloading and uploading text and control files between the user and the network server. These application-specific HTTP and FTP programs are included in Intelligent A/V receiver 10 for providing the interface with PC/Web TV 26.

Figure 2:
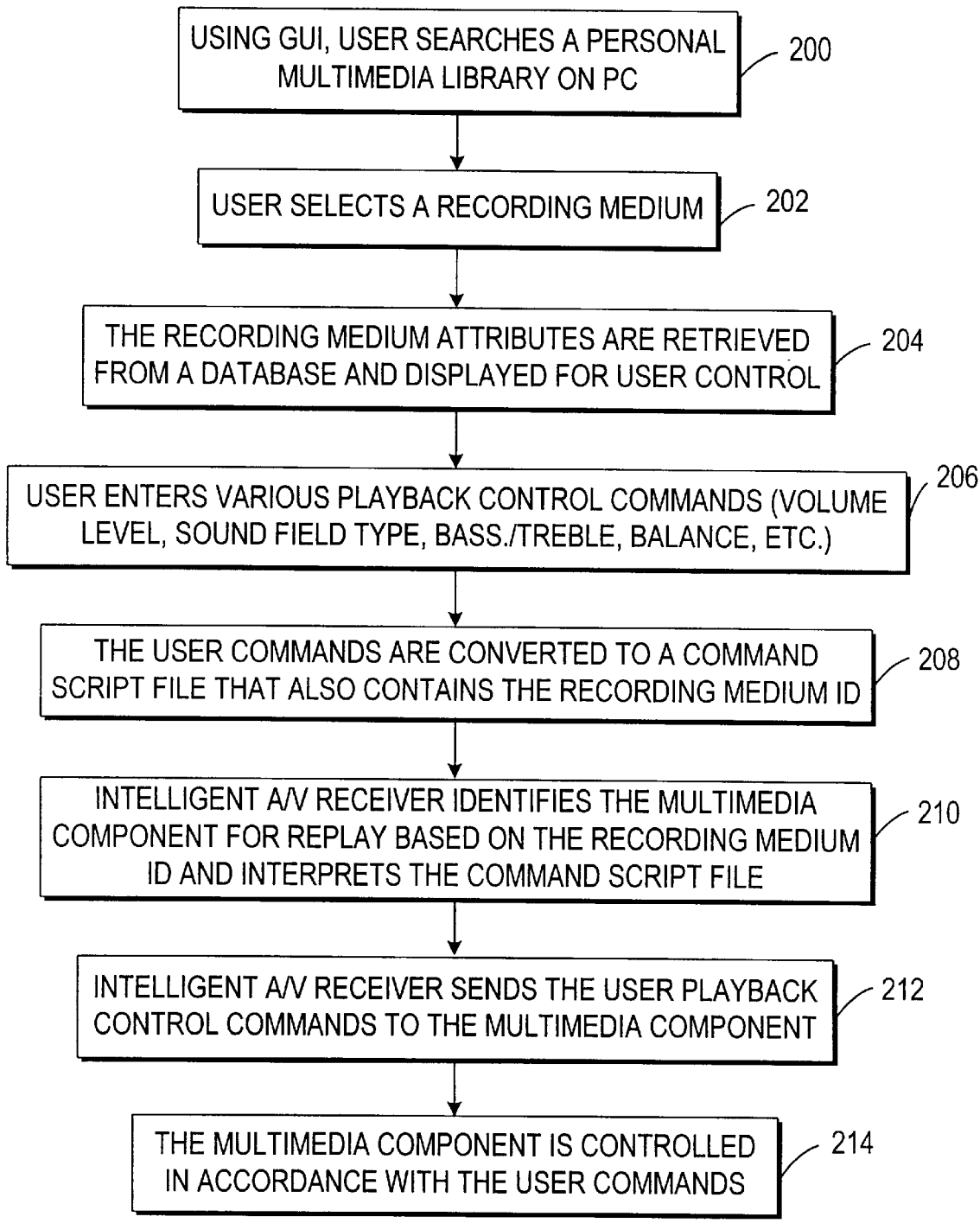
FIG. 2 is a functional flowchart of the system according to one aspect of the present invention.
Figure 4:
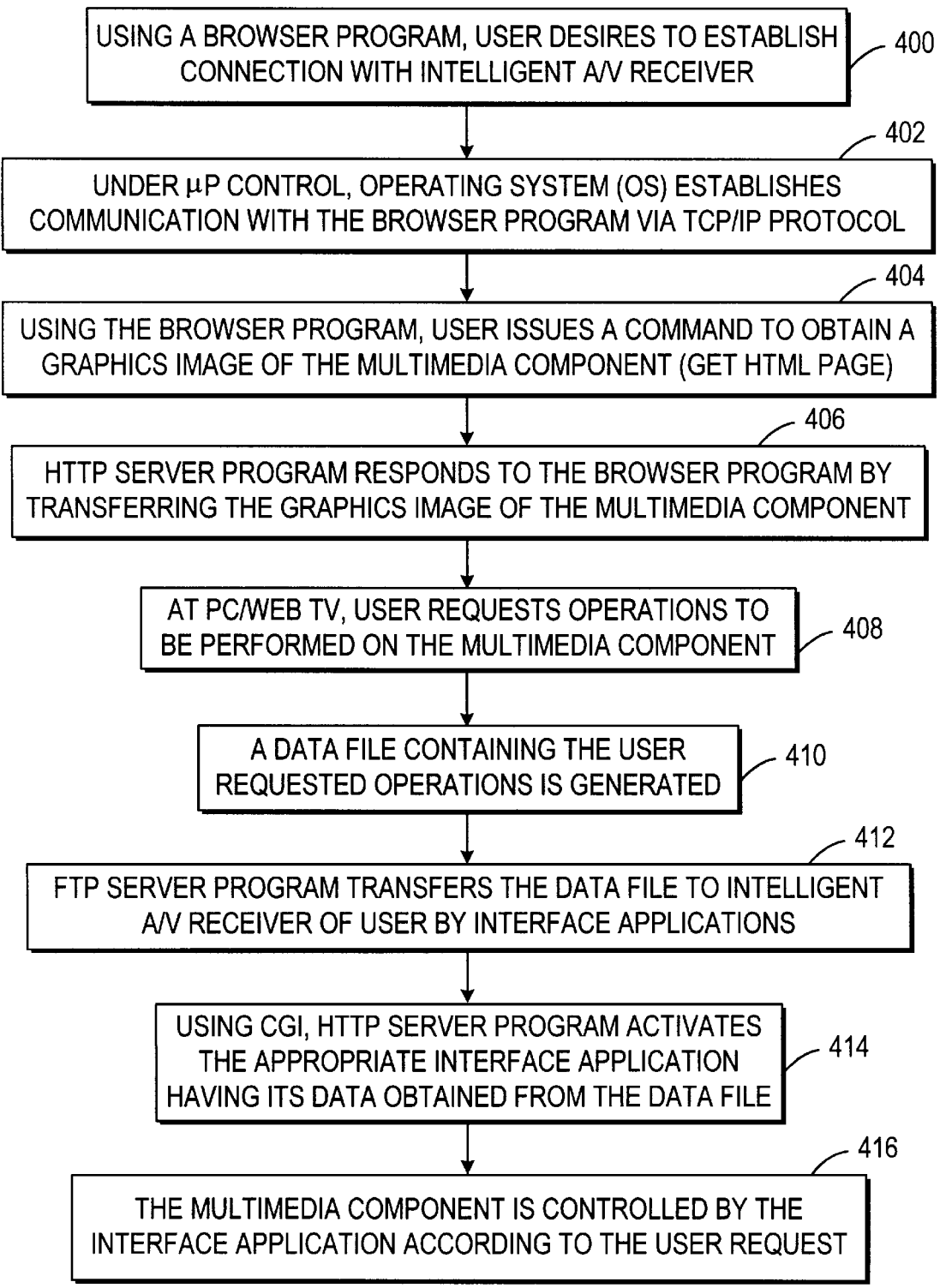
FIG. 4 is a functional flowchart of the interface block diagram of FIG. 3.

FIGS. 3 and 4 illustrate in detail the interface (communications path) between PC/Web TV 26 and Intelligent A/V receiver 10 as described in the above example in connection with FIGS. 1 and 2. In FIG. 3, like reference numerals represent the same or identical components of the present invention, and the description of those components already described with reference to FIG. 1 will be omitted for clarity.

In FIG. 3, microprocessor 32 executes the program instructions for carrying out various user requested operations. Data storage 34 (Random Access Memory (RAM)/ Read Only Memory (ROM)), among other things, provides the storage for various software modules indicated with dashed lines. These software modules will now be explained in detail in accordance with FIG. 4 illustrating the interface operation between PC/Web TV 26 and Intelligent A/V receiver 10.

In step 400, the user desires to establish connection with Intelligent A/V receiver 10 using a "Web" browser program on his PC. As known in the art, the "Web" browser provides GUI access to network servers, for example. In response to this user request, the "handshaking" commands are sent from the PC/Web TV 26 to Intelligent A/V receiver 10. In step 402, under the microprocessor control, Operating System (OS) establishes communication with the "Web" browser via Transmission Control Protocol/Internet Program (TCP/IP) protocol using TCP/IP stack 38. As known in the art, TCP/IP protocol was developed for linking dissimilar processors across dissimilar networks and is currently used for the Internet communications.

In step 404, in response to the user instructions to obtain a graphics image of the multimedia component, the "Web" browser program, as executed by the processor, generates "GET Hypertext Markup Language (HTML) Page" command for Intelligent A/V receiver 10. HTTP server module 40 responds to the processor-executed instructions of the "Web" browser by transferring the graphics image of the multimedia component to PC/Web TV 26.

In step 408, the user requests various operations to be performed on the multimedia component. Such operations may include the volume control, bass/treble, balance, etc. as mentioned above in connection with FIGS. 1 and 2. In step 410, a data file containing the user requested commands is generated in PC/Web TV 26.

In step 412, FTP module 42 transfers the data file to Intelligent A/V receiver 10 for use by interface applications 44. Interface applications 44 residing in data storage 34 perform the actual control operations of the multimedia components (VTR 16, DAT player 20, CD player 18) of A/V system 14.

In step 414, using the CGI program, HTTP server module activates the appropriate interface application having its data obtained from the data file. In step 416, the multimedia component is then controlled by the interface application according to the user request. Namely, the volume is adjusted to the desired level, a particular track is reproduced, etc.

Figure 5:
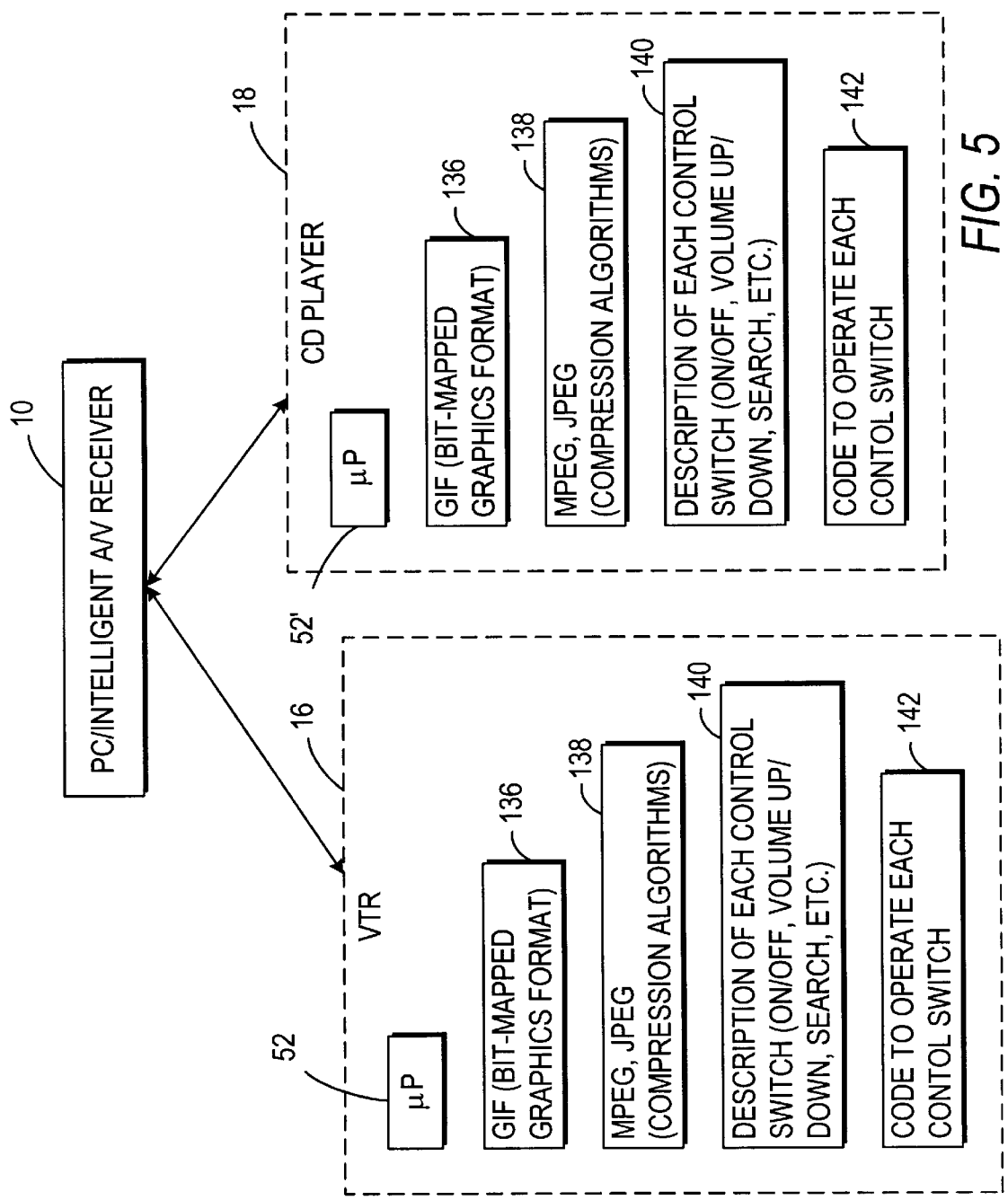
FIG. 5 is a detailed block diagram of the interface between Intelligent A/V receiver 10 and multimedia components of A/V system 14.
Figure 6:
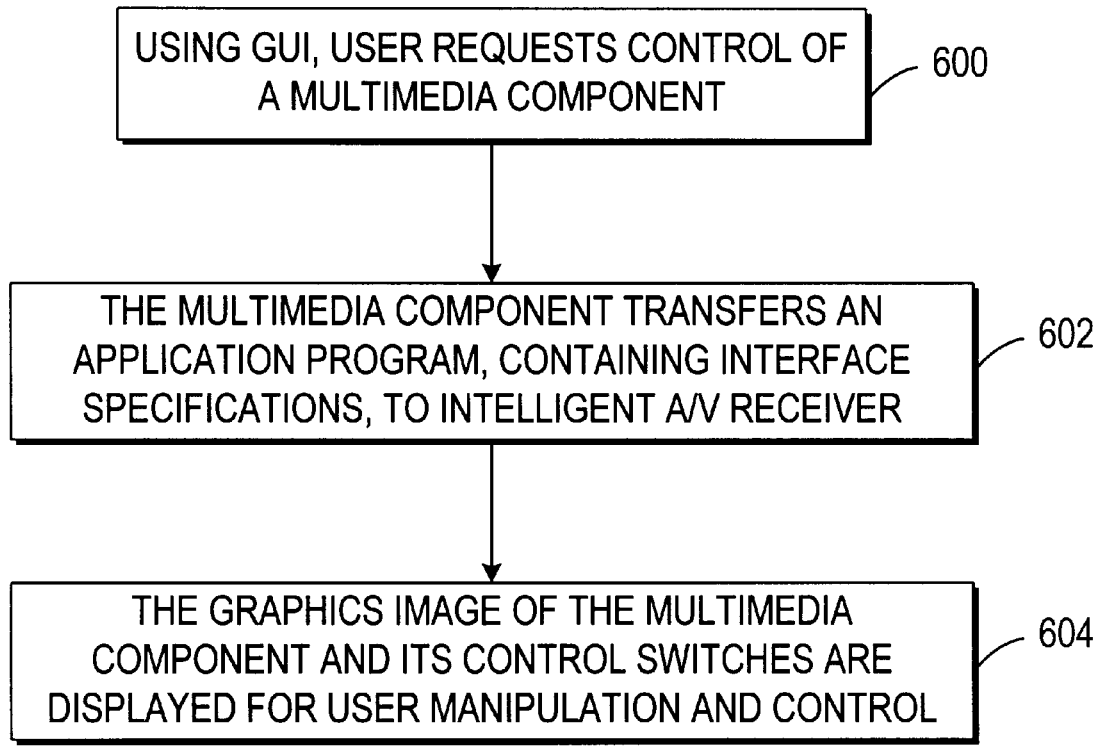
FIG. 6 is a functional flowchart of the interface block diagram of FIG. 5.

FIGS. 5 and 6 illustrate in detail the interface between multimedia components of A/V system 14 and Intelligent A/V receiver 10, as described in the above example in connection with FIGS. 1 and 2. Again, like reference numerals represent the same or identical components of the present invention, and the description of those components already described with reference to FIGS. 1 and 3 will be omitted.

In conventional interfaces, such as for example an infra-red (IR) remote control device controlling a television set, there is no reverse channel communication. That is, the television set cannot transmit control information to the IR remote control device. This prior art one-way communication may present a problem in the systems where additional components are to be added. In these conventional systems, the controlling device must be reprogrammed (updated) with the new interface information to add this new component to the system.

To overcome the above disadvantage, FIG. 5 shows VTR 16 and CD player 18 containing programmable processors 52, 52' and various software modules comprising the interface specifications for those components. The program instructions in those software modules are executed by programmable processors 52, 52'. Namely, in accordance with another aspect of the present invention, the interface data required for connecting the multimedia component of A/V system 14 to Intelligent A/V receiver 10 is located in a data storage (RAM, ROM, or other memory device) of that component.

For example, ROM of VTR 16 contains a bit-mapped graphics module, in conformance with Graphics Interface Format (GIF) 136 for example, for encoding and displaying the graphics image of the multimedia component. In addition, the graphics image of control switches located on the multimedia component is generated on the display screen of PC/Intelligent A/V receiver 10 or PC/Web TV 26 as a result of executing the GIF-based program. Also included in the component memory are various audio/image compression algorithms 138, such as, for example, Motion Picture Expert Group (MPEG) or Joint Photographic Experts Group (JPEG), as applicable. These algorithms are used for reducing the amount of data that needs to be recorded on the recording medium for high fidelity reproduction. The description of each control switch (on/off, volume control, bass/treble, balance, etc.) is stored in another ROM/RAM module 140. In addition, another software module 142 contains the code needed to operate each control switch.

In operation, as illustrated in FIG. 6, using the GUI program at PC/Web TV 26, the user selects a multimedia component in his or her A/V system 14 and requests control of that component in step 600. In step 602, the selected multimedia component transfers an appropriate application program to Intelligent A/V receiver 10. The application program includes interface specifications (modules 136, 138, 140 and 142 of FIG. 5) for that particular component. Once the application program is transferred to Intelligent A/V receiver 10, the graphics image of the component and its control switches are displayed in step 604 for user manipulation and control. That is, all of the necessary graphics and control files in a single application are transferred from the multimedia component for providing a seamless interface between that component and Intelligent A/V receiver 10 without the need for controller update, and for allowing the user to control A/V system 14 using PC/Web TV 26.

In yet another aspect of the present invention, various sound fields, based on the music type and the room in which A/V system 14 is located, are generated and transferred to Intelligent A/V receiver 10 for use in the appropriate interface application program. The sound fields create the listening effect, as if one is, for example, in a jazz club listening to jazz, by using the room configuration and objects in the room.

Figure 7:
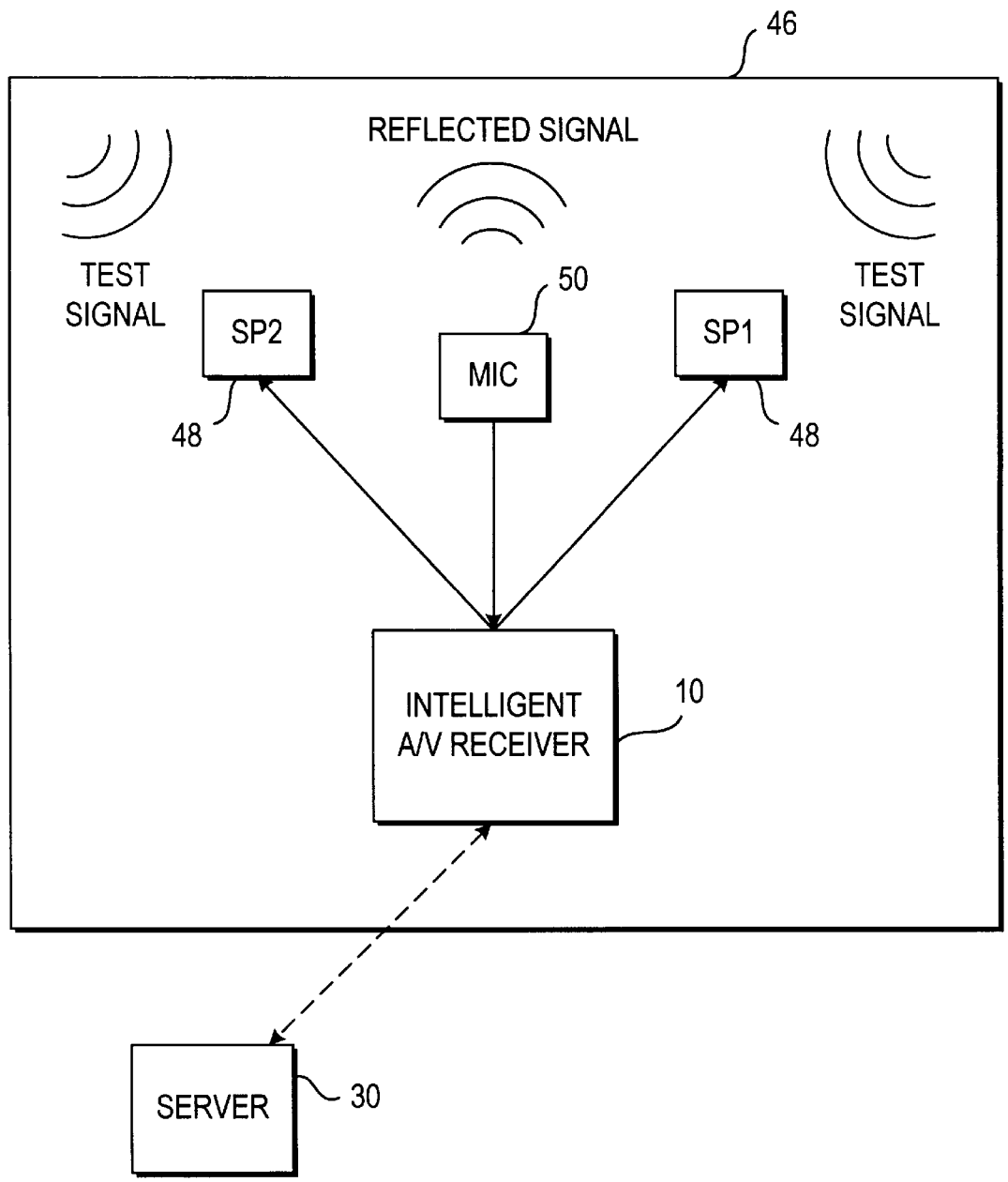
FIG. 7 is a detailed block diagram for generating and processing sound fields in accordance with one aspect of the present invention.

FIG. 7 shows representative room 46 with Intelligent A/V receiver 10, among other things. Connected to Intelligent A/V receiver 10 are a pair of speakers 48 and microphone 50. Server 30 is communicatively coupled with Intelligent A/V receiver 10 via a direct cable, a network, the Internet 22, etc.

Figure 8:
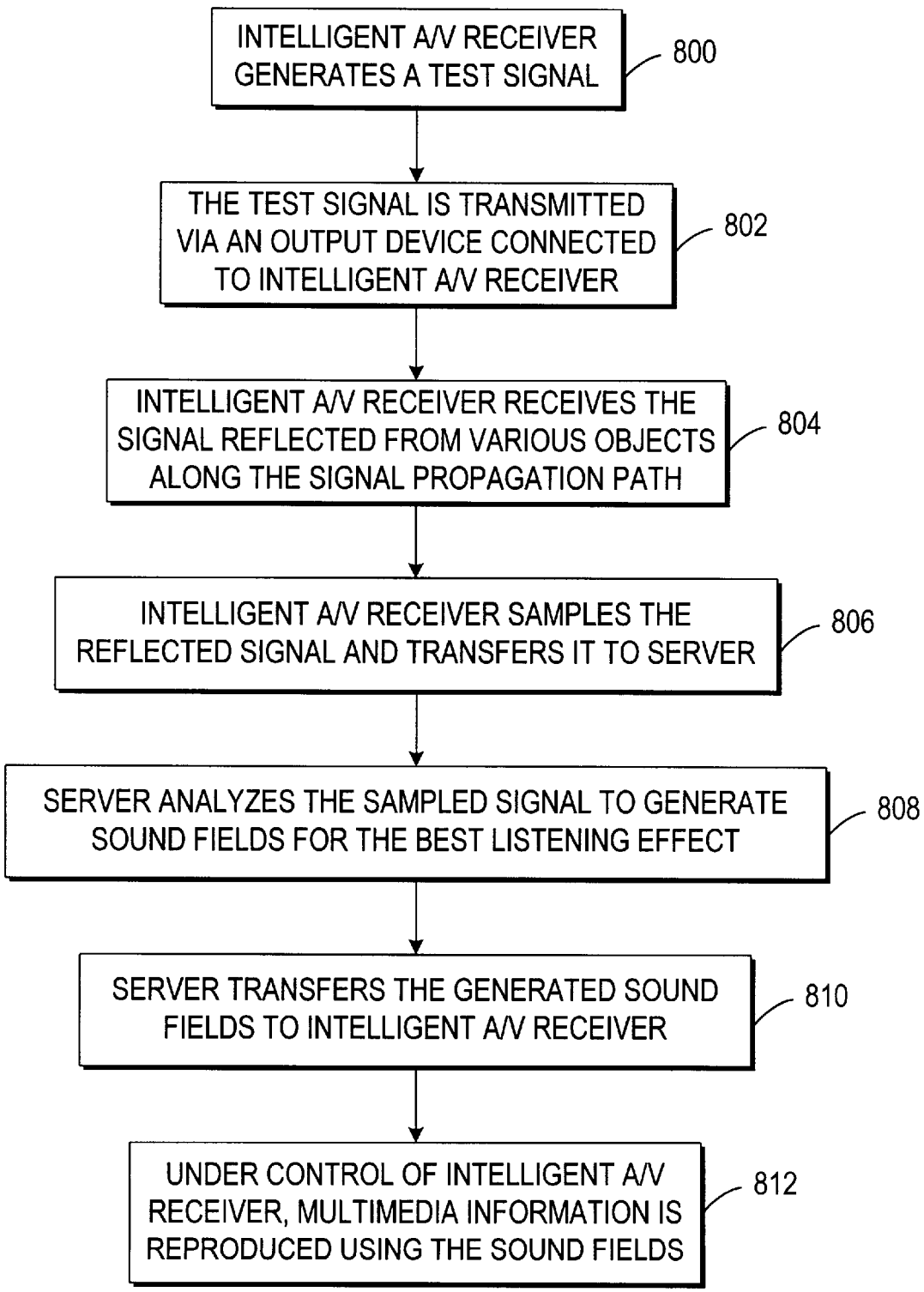
FIG. 8 is a functional flowchart of the block diagram of FIG. 7.

In conjunction with FIG. 7, FIG. 8 illustrates the operation of the system according to this aspect of the present invention. In step 800, Intelligent A/V receiver 10 generates a test signal which may be a pulse, a sine wave, etc. In step 802, the generated test signal is transmitted from the speakers 48. In step 804, Intelligent A/V receiver 10 receives the signal reflected from various objects in room 46. It is noted that the walls, ceiling, floor, furniture, etc. located along the propagation path of the test signal cause the signal reflections and deflections which are picked up by microphone 50. That is, the test signal bounces off the various objects and is received by microphone 50 of Intelligent A/V receiver 10.

The received signal is sampled by A/D converters (not shown) in Intelligent A/V receiver 10, and then stored. Next, Intelligent A/V receiver 10 transfers the sampled signal to server 30 in step 806. In step 808, server 30 analyzes the sampled signal to generate a plurality of sound fields according to the room configuration. Under control of Intelligent A/V receiver 10, multimedia information is reproduced in step 812 using the sound fields generated by server 30 and in accordance with the user request.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A system for controlling a plurality of multimedia components, each multimedia component having a plurality of control switches, said system comprising:

means for transferring, by one of said multimedia components to an intelligent device operatively coupled to a display, an interface specification for the one multimedia component, said interface specification including data corresponding to a graphic image of the one multimedia component, said graphic image being displayable on said display;

means for entering to said intelligent device instructions representing control operations to be carried out by the one multimedia component; and means for converting the instructions to at least one command for controlling the one multimedia component.

2. The system according to claim 1, wherein the data corresponding to the graphic image further includes data corresponding to a graphical representation of the control switches of the one multimedia component.

3. The system according to claim 2, wherein said one multimedia component includes a read only memory (ROM) containing a bit-mapped graphics module for encoding and displaying the graphics image.

4. The system according to claim 1, wherein said means for entering instructions comprises an input device for selecting on the display graphical representations corresponding to the control operations to be carried out by the one multimedia component.

5. The system according to claim 4, wherein the graphics image of the multimedia component and of the control switches is generated in response to user selection of a graphics object representing the data storage medium displayed on the display screen.

6. The system according to claim 1, further comprising means for determining a correspondence between user selected data storage medium and the multimedia component.

7. An apparatus for controlling a plurality of multimedia components as directed by a remote user operated device having a computer network browser program to access sites in a computer network and to access respective multimedia components via said apparatus through the computer network, said apparatus comprising:

a programmable controller;

a data storage medium for storing data as directed by the programmable controller;

means for providing an interface with the user operated device and for receiving instructions from said user operated device through the computer network representing control operations to be carried out by one of said multimedia components, said means comprising program instructions that are executable by the programmable controller; and means for converting the instructions to at least one command for controlling the one multimedia component.

8. The apparatus according to claim 7, wherein said means for providing an interface and receiving instructions is operative to transfer graphic image data of the one multimedia component from the apparatus to the remote user device through the computer network, so as to display the graphic image on the user operated device to thereby facilitate a multimedia control operation selection by the user.

9. A multimedia component having a plurality of control switches for controlling at least reproduction of multimedia information, comprising:

a programmable controller; and means for storing an interface specification comprising a plurality of program instructions that are executable by the programmable controller.

10. The apparatus according to claim 9, wherein the interface specification includes a graphics image of the multimedia component and of the control switches.

11. The apparatus according to claim 9, wherein the interface specification includes a control code for activating the control switches.

12. A method for controlling a plurality of multimedia components and for manipulating multimedia information in a data storage medium, each multimedia component having a plurality of control switches, said method comprising the steps of:

storing in said data storage medium a multimedia library containing a list of program segments selected from the group consisting of audio and video segments and combinations thereof, with each program segment being stored on one of plural types of record media, each record medium being operable in one of said multimedia components;

displaying said list of program segments;

receiving a user selection for a reproduction of one of said program segments;

identifying which one of said plural types of record media and corresponding multimedia component is associated with the program segment selected;

receiving instructions representing control operations to be carried out by the identified multimedia component; and converting the instructions to at least one command for controlling the identified multimedia component.

13. The apparatus according to claim 7, wherein said apparatus is an intelligent receiver adapted to receive at least wireless radio broadcasts.

14. The apparatus according to claim 7, wherein the computer network is the Internet and said means for providing an interface and for receiving instructions includes HTTP server software, FTP server software and a TCP/IP stack.

15. The apparatus according to claim 7, wherein said apparatus is an intelligent receiver adapted to receive at least wireless radio broadcasts, the computer network is the Internet, and said means for providing an interface and for receiving instructions includes HTTP server software, FTP server software and a TCP/IP stack.

16. The apparatus according to claim 7, wherein said user operated device is selected from the group consisting of a computer and an integrated television/personal computer.

17. The multimedia component according to claim 9, wherein said means for storing an interface specification comprises a read only memory (ROM) containing a bit-mapped graphics module for encoding and displaying the graphics image.

18. The multimedia component according to claim 17, wherein said ROM further includes stored audio/image compression algorithms.

19. The method according to claim 12, further comprising transferring, by a given one of said multimedia components to said data storage medium, an interface specification for the given one multimedia component, said interface specification including data corresponding to a graphic image of the given one multimedia component.

* * * * *